(12) United States Patent
Bichot et al.

(10) Patent No.: US 8,132,249 B2
(45) Date of Patent: Mar. 6, 2012

(54) METHOD FOR ESTABLISHING A MULTI-LINK ACCESS BETWEEN A LOCAL NETWORK AND A REMOTE NETWORK, AND CORRESPONDING APPLIANCE

(75) Inventors: Guillaume Bichot, La Chapelle Chausse (FR); Yvon Legallais, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 913 days.

(21) Appl. No.: 11/919,098

(22) PCT Filed: Apr. 20, 2006

(86) PCT No.: PCT/EP2006/061692
§ 371 (c)(1),
(2), (4) Date: Oct. 23, 2007

(87) PCT Pub. No.: WO2006/114383
PCT Pub. Date: Nov. 2, 2006

(65) Prior Publication Data
US 2009/0313690 A1     Dec. 17, 2009

(30) Foreign Application Priority Data
Apr. 25, 2005   (FR) ...................................... 05 51066

(51) Int. Cl.
*G06F 21/00* (2006.01)
(52) U.S. Cl. .................. 726/12; 726/4; 726/8; 713/160; 713/168; 713/171

(58) Field of Classification Search ...................... 726/12
See application file for complete search history.

(56) References Cited

U.S. PATENT DOCUMENTS

| 4,841,523 A | * | 6/1989 | Roffinella et al. | 370/460 |
| 5,509,010 A | * | 4/1996 | La Porta et al. | 370/397 |
| 6,061,346 A | * | 5/2000 | Nordman | 370/352 |
| 6,084,956 A | * | 7/2000 | Turner et al. | 379/230 |
| 6,085,234 A | * | 7/2000 | Pitts et al. | 709/217 |
| 6,167,446 A | * | 12/2000 | Lister et al. | 709/223 |

(Continued)

FOREIGN PATENT DOCUMENTS

JP    2000216815    8/2000

(Continued)

OTHER PUBLICATIONS

K. Sklower University of California et al: The PPP Multilink Protocol (MP), IETF Standard, Internet Engineering Task Force, IETF, CH, Aug. 1996, XP015007774, Entire document.*

(Continued)

*Primary Examiner* — Kambiz Zand
*Assistant Examiner* — Yonas Bayou
(74) *Attorney, Agent, or Firm* — Tutunjian & Bitetto, P.C.

(57) ABSTRACT

The invention enables the different access links between a local network and a remote network to be used in a common and transparent manner. The invention is based on the use of various IP tunnels using the different access links between an appliance on the local network of the user and an appliance on the remote network. Said tunnels are embodied as a single link providing access to the remote network.

9 Claims, 6 Drawing Sheets

U.S. PATENT DOCUMENTS

| | | | |
|---|---|---|---|
| 6,237,036 B1 * | 5/2001 | Ueno et al. | 709/225 |
| 6,487,598 B1 * | 11/2002 | Valencia | 709/227 |
| 6,502,192 B1 * | 12/2002 | Nguyen | 726/4 |
| 6,715,082 B1 * | 3/2004 | Chang et al. | 726/8 |
| 7,493,411 B1 * | 2/2009 | Armistead et al. | 709/238 |
| 7,734,789 B2 * | 6/2010 | Calhoun | 709/227 |
| 2002/0133618 A1 * | 9/2002 | Desai et al. | 709/238 |
| 2004/0090919 A1 | 5/2004 | Callon et al. | |

FOREIGN PATENT DOCUMENTS

| | | |
|---|---|---|
| JP | 2001060956 | 3/2001 |
| JP | 2004274702 | 9/2004 |
| WO | WO 02/41660 | 5/2002 |
| WO | WO 0241660 A1 * | 5/2002 |

OTHER PUBLICATIONS

D.S. Phatak et al: IP-in-IP tunneling to enable the simultaneous use of multiple IP interfaces for network level connection striping, Dept. of Computer Science and Electrical Engineering, UMBC, Computer E. Duros, UDcast, W. Dabbous, INRIA Sophia-Antipolis, H. Izumiyama, N. Fujii, WIDE, Y. Zhang, E. HRL: "A Link-Layer Tunneling Mechanism for unidirectional Links" IETF. Standard, Internet Engineering Task Force, IETF, CH, Mar. 2001, XP015008860.

E. Gustafsson et al: "Always Best Connected" IEEE Wireless Communications, IEEE Service Center, Piscataway, NJ, US., vol. 10, No. 1, Feb. 2003, pp. 49-55.

G. Bichot: "A Multi-link architecture for a global wireless Internet connectivity" Broadwan Workshop 2005, May 24, 2005, XP-002391596pp. 1-5.

G. Bichot: "A Multi-link architecture for a global wireless Internet connectivity" Broadwan Workshop 2005, May 24, 2005,XP-002391597 pp. 1-17.

G. Bichot: "A multilink architecture for a global wireless Internet connectivi" Wibrace Workshop 2005, Jun. 23, 2005, XP-002391598, pp. 1-17.

Search Report Dated Jul. 21, 2006.

* cited by examiner

METHOD FOR ESTABLISHING A MULTI-LINK ACCESS BETWEEN A LOCAL NETWORK AND A REMOTE NETWORK, AND CORRESPONDING APPLIANCE

This application claims the benefit, under 35 U.S.C. § 365 of International Application PCT/EP2006/061692, filed Nov. 2, 2006, which was published in accordance with PCT Article 21(2) on Nov. 2, 2006 in French and which claims the benefit of French patent application No. 0551066, filed Apr. 25, 2005.

1. TECHNICAL FIELD

This invention relates to Internet access for a user and more specifically to the common operation of several access links between the home and the network.

2. TECHNOLOGICAL BACKGROUND

Figure 1:
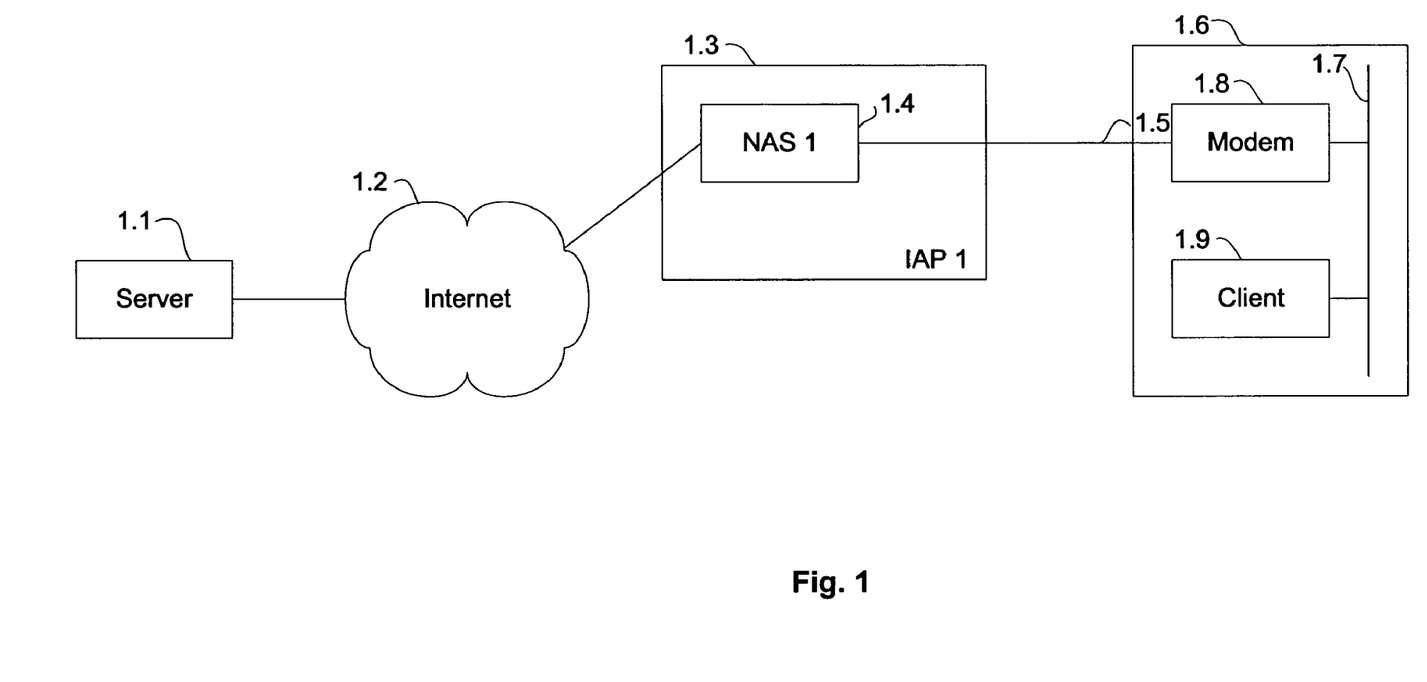
FIG. 1, represents the known diagram of the connection of a local network to the Internet.

Connection to a remote network, for example Internet, from the user network, illustrated by FIG. 1, is traditionally achieved with the help of an access device, generally called modem, referenced 1.8, whether it effectively concerns a modulation demodulation appliance of digital signals on an analogue link or by extension another technology. This modem enables a link, referenced 1.5, to be established between this device and a peer, referenced 1.4, within the network of an access provider, referenced 1.3. The peer being called a NAS (Network Access Server). The IP communications between the user network and the remote network, herein the Internet network referenced 1.2, are directed via the modem and pass through the link. The IP packets meant for purposes other than the user's internal network, referenced 1.7, are routed via the modem, the incoming packets are those routed from the remote network via the NAS then the modem on the user network. A client, referenced 1.9, within the user's house, referenced 1.6, can therefore access a server, referenced 1.1, available on the Internet.

Figure 2:
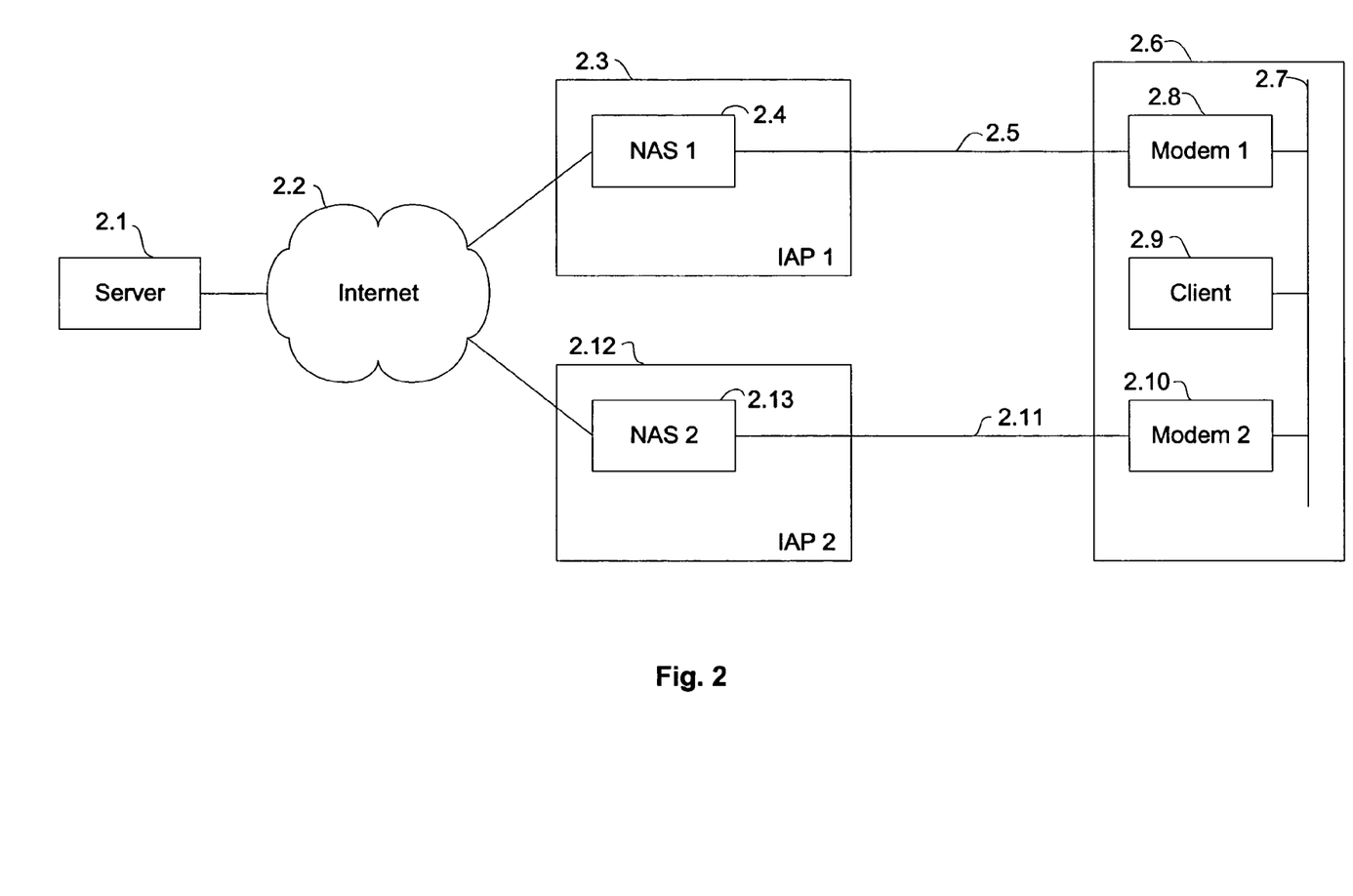
FIG. 2, represents the known diagram of the connection of a local network to the Internet via two different accesses.

The development of connection techniques to a remote network leads to the existence of multiples operators offering this connection by means of various technical solutions. It is therefore now possible for a user to have several accesses to a remote network. The user can, for instance, have at his disposal access through a standard modem, known as PSTN, and higher speed access offered by his cable operator wherein lies an offer comprising Internet access, telephony over IP and television via an ADSL type connection. This type of user network is illustrated in FIG. 2. In this figure, we can see the home of a user, referenced 2.6, hosting the user network, referenced 2.7. A client, for example a personal computer, referenced 2.9 is connected to this network 2.7. A first modem, referenced 2.8, for example a PSTN modem, offers a first access via a first access provider, referenced 2.3. This access provider 2.3 hosts an access device to its network referenced 2.4 enabling the modem 2.8 to open a link referenced 2.5. This access provider therefore offers access via its NAS 2.4 to the remote network, typically Internet, referenced 2.2. The user possesses a second modem, referenced 2.10, enabling him to access the Internet via a similar access offered by a second provider, referenced 2.12. The manner in which the client 2.9 will access a server, referenced 2.1, over the Internet and the access used will be determined by configuration of the routing tables of the client.

Solutions allowing common operation of several accesses do exist. It is possible for instance to couple a mono-directional access via satellite and a low-speed PSTN connection.

In this case, the low-speed connection is used for sending queries while the high-speed downstream connection is used for the responses. The low-speed connection is therefore dedicated to the outgoing traffic, while the high-speed connection is dedicated to the incoming traffic.

There are also other solutions that make it possible to share different access links within the network. In this case the choice of the access used is made at the IP connection level. A given IP connection will be established via one of the accesses. In this case a query and its response must use the same access.

However, a common operation of the different access links in a transparent manner, making it possible to use the different accesses each of which has its own bandwidth, as a single access possessing a bandwidth equal to the sum of the bandwidths of the different access links is not possible.

3. SUMMARY OF THE INVENTION

The invention enables the different access links between a local network and a remote network to be used in a common and transparent manner. The invention is based on the use of various IP tunnels using the different access links between an appliance on the local network of the user and an appliance on the remote network. Said tunnels are embodied as a single link providing access to the remote network.

The invention relates to a method of connecting a local communication network through digital data packets to a remote network comprising at least the following steps:

A step relating to the opening of a first connection between a modem connected to the local network and the remote network via a first access network, A step relating to the opening of at least a second connection between the said modem and the remote network via a second access network, A step wherein each of the connections thus opened, establish a corresponding communication tunnel between the modem and an appliance connected to the remote network called Gateway using the said connection, and A step wherein for each digital data packet exchanged between the local network and the remote network, as much through the modem as through the gateway, a choice of the tunnel used for routing the packet.

According to a specific embodiment, the method furthermore comprises a step relating to the allocation of an address to the modem by the gateway.

According to a specific embodiment, the method furthermore comprises the opening of a control link between the modem and the gateway using one of the connections opened.

According to a specific embodiment, the choice step is carried out according to parameters specific to each tunnel.

According to a specific embodiment, the parameters specific to each tunnel used in the choice step include the instantaneous usage rate of each connection.

The invention also relates to a communication appliance between a local communication network through digital data packets to a remote network comprising a plurality of means of opening of connections between the local network and the remote network, characterized in that it furthermore comprises means to establish, for each connection opened, a tunnel between itself and an appliance connected to the remote network, called gateway, using the connection and for each data packet that it relays between the local network and the remote network, means of choice of the tunnel used to relay the said packet.

According to one particular embodiment, the communication appliance furthermore comprises the management means of an address on the network allocated by the said gateway.

According to one particular embodiment, the communication appliance furthermore comprises management means for a control link between itself and the gateway using one of the connections opened.

The invention also relates to an appliance for relaying data packets that can be connected to a communication network through digital data packets characterized in that it comprises a means of managing a plurality of tunnels between itself and a remote appliance over the network and for each data packet that it relays towards the remote appliance, means of choice of the tunnel used for relaying the said packet.

According to one particular embodiment, the relay appliance furthermore comprises means of allocation of an address to the remote appliance.

According to one particular embodiment, the relay appliance furthermore comprises means of management of a control link between itself and the remote appliance.

According to one particular embodiment, the means of choice of the tunnel are carried out according to parameters specific to each tunnel.

According to one particular embodiment, the parameters specific to each tunnel used by the means of choice include the instantaneous usage rate of each connection opened between the remote appliance and the network and sent by the remote appliance.

4. LIST OF DRAWINGS

The invention will be better understood, and other specific features and advantages will emerge from reading the following description, the description making reference to the annexed drawings wherein.

5. DETAILED DESCRIPTION OF THE INVENTION

A detailed description of the invention as well as an embodiment will now be described.

The routing rules used by IP networks are such that in a configuration such as the one described in FIG. 2, the response to a query passing through one of the access links will necessarily use the same link during its return. In fact, each access provider allocates an address or a set of addresses to the user. Two ways of managing the addressing of the user appliances within his local network can be used. A first solution consists in direct addressing. In this case the access provider supplies addresses within its own addressing space to the different appliances of the local network. The said appliances will therefore be embodied, at the IP addressing level, as appliances that are an integral part of the access provider's network. This type of addressing is still commonplace in the case of the connection of a single appliance to the Internet. In order to offer more flexibility to the user, it is possible to use an address translation technique at the modem level. This enables him to connect as many appliances as he wishes to the domestic network without, for all this, requiring as many addresses within the addressing space of its access provider. The modem is seen here as a router serving as an access gateway. This technique, which is well known under the name of NAT (Network Address Translation), makes it possible to freely organize the addressing space of the user network. In this case, an address is allocated to the modem on the local network coherent with this private addressing space. However, when the connection is set up with the access provider, a second IP address is allocated to the modem by the access provider within its own addressing space. The modem therefore has two addresses, one for the interface connecting it to the domestic network and the other for the interface connecting it to the access provider. When a client of the home network sends a packet to the remote network, the source address of the packet will be translated by the modem that replaces it with its own address within the provider's network. The modem therefore appears as the source appliance of all the packets originating from the local network and meant for the remote network. The modem keeps the trace of the translations made in such a manner as to be able to send back over the internal network the packets constituting the responses that it receives. Here, it replaces its own address used in the address of the destination of the packets by the address on the user network of the client.

Owing to this, a query originating from the local network will be seen on the remote network as having its origin in the access provider's network used for sending the query. The response to this query will therefore be directed towards this access provider and can reach the client only via the network of this provider. The access used for this query therefore governs the access used for the response. We can therefore see that though it is possible to use several accesses between a local network and a remote network, the choice of the access can only be made at the session level.

If one wishes to share several access links between a local network and a remote network, in a transparent manner and in such a fashion as to be able to make full use of all the available bandwidth, one must design a mechanism making it possible to route the traffic at the packet level.

Figure 3:
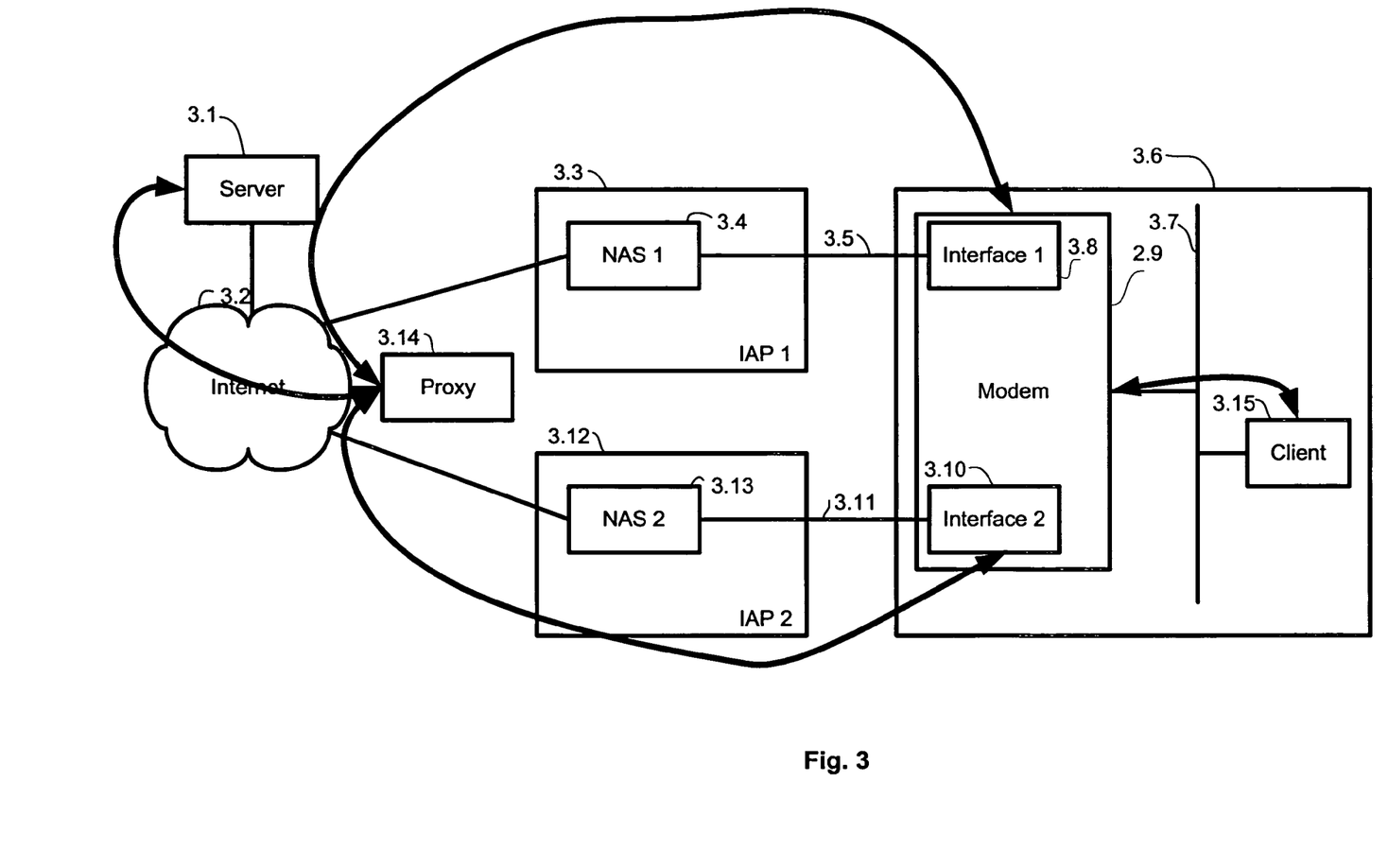
FIG. 3 represents the connection diagram of a local network to the Internet according to one embodiment of the invention.

An embodiment of such a mechanism will now be described. The architecture of this example is illustrated in FIG. 3. The space of a user, referenced 3.6, comprises a local network, referenced 3.7, at least one client referenced 3.15. The user possesses several accesses with, for instance, different access providers. The figure illustrates two access providers, IAP 1 and IAP 2, referenced 3.3 and 3.12. Each of these providers has an access server to the remote network at its disposal. These network access servers (NAS for Network Access Server) NAS 1 and NAS 2 referenced 3.4 and 3.13, grant access to the remote network, in this case the Internet referenced 3.2. The remote network 3.2 hosts servers such as the server referenced 3.1 in the figure. We therefore seek to establish a connection between the client 3.15 and the server 3.1 by jointly using the accesses offered by both access providers. The principle illustrated here for two providers can be directly generalized to more than two providers. The embodiment of the invention is based on the one hand on a relay appliance called a multi-link gateway, referenced 3.14, and connected to the remote network 3.2 and on the other hand on a multi-link modem, referenced 2.9, directly controlling the interfaces, referenced 3.8 and 3.10, enabling the opening of an access to each access provider. The embodiment of the invention is based on the establishment of IP tunnels between the multi-link modem and the multi-link gateway. The multi-link modem, like the multi-link gateway, chooses the tunnel and therefore the access used for each data packet exchanged between the local network and the remote network. This choice may be dependent on various parameters such as the bandwidth of each access, the type of traffic in which the packet participates, instantaneous statistics of use of each link, the transfer time of the packet (round trip delay) or any other relevant parameter. In this manner, the different tunnels established will be jointly used in such a manner as to form what we call a multi-link.

Figure 4:
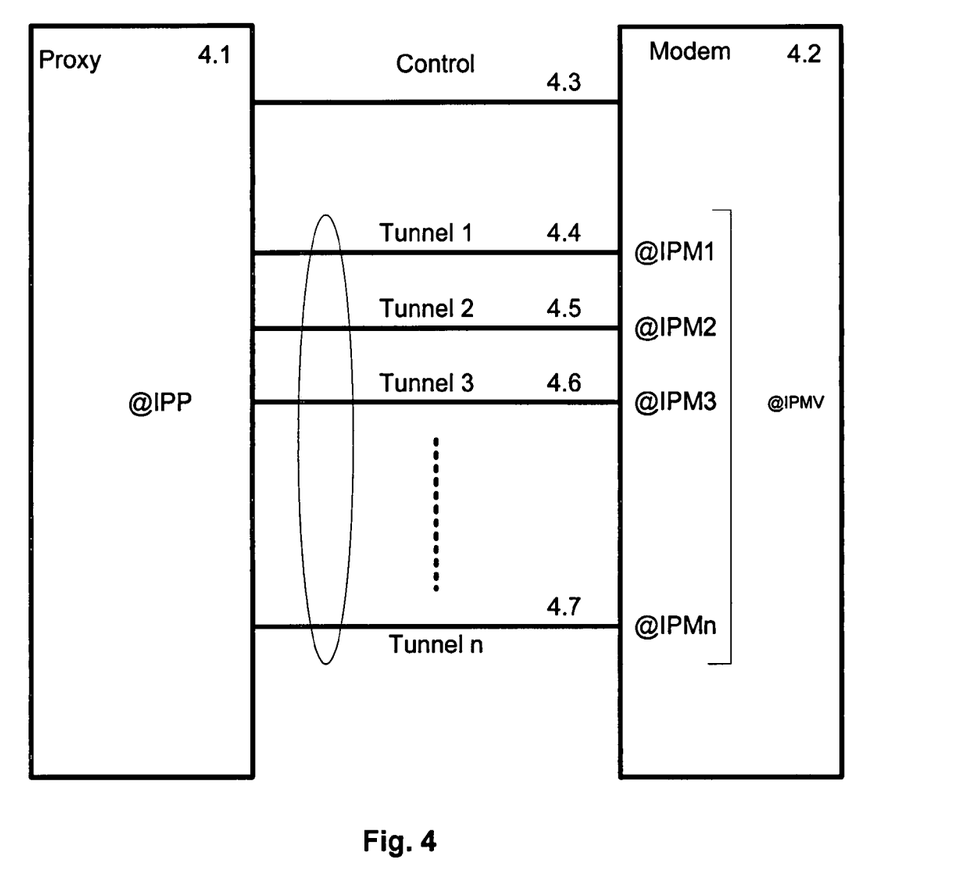
FIG. 4 represents the logical diagram of the connexion said to be multi-link according to one embodiment of the invention.

FIG. 4 illustrates the logical links existing between the multi-link gateway, referenced 4.1 and the multi-link modem, referenced 4.2. A first connection, referenced 4.3, is initiated, for example, by the multi-link modem in an initialization phase. This connection is dedicated to the exchanges between the multi-link gateway and the multi-link modem for the purpose of controlling the functioning of the multi-link. Subsequently, one connection per access, referenced 4.4, 4.5, 4.6 and 4.7, is identified. An IP tunnel is constituted on each of these connections. The IP tunnels can for instance be constituted by using the GRE protocol (Generic Routing Encapsulation) defined in the request for comments RFC2784 of the IETF (Internet Engineering Task Force). Each tunnel is established on the one hand between the gateway in its IP address on the remote network, called @IPP in the figure and the address allocated to the modem by each IAP, at the time of establishing the connection, called @IPMi, i being the access number.

During an initialization phase, the multi-link modem will begin by opening the connections of each of the interfaces with the remote network. The opening of this connection is done with the help of known protocols like for example PPP (Point to Point Protocol) used for example for standard PSTN, DHCP connections (Dynamic Host Control Protocol) used over Ethernet, PPPoE (PPP over Ethernet) used for example for ADSL connections, or any other type of protocol enabling the establishment of a connection. In a general manner, at the time of establishing the connection, an IP address will be allocated by the access provider to the connecting appliance. This IP address will therefore be supplied to the multi-link modem which will be equipped with one address per access, each address corresponding to the interface connecting it to the network.

Once the different connections are open, the modem will indifferently use any one of them for establishing the control connection with the multi-link gateway. The manner in which the modem recognizes the address of the gateway is indifferent, it can for instance involve a manual configuration or a parameter sent by one of the access providers at the time of establishing one of the connections.

Once this connection or control link is established, the multi-link must be established. This establishment can begin with a possible authentication phase between the gateway and the modem. Subsequently the modem will declare the various connections established as well as the address that was allocated to it for each connection.

Then, in the same manner as an NAS allocates an IP address in its own addressing space to a connecting appliance, the multi-link gateway will allocate an IP address to the multi-link modem in its own addressing space. This address is called @IPMV, as the virtual IP address of the modem. The flow of the packets exchanged between the client and a server of the remote network through the multi-link will be described farther ahead.

The appliances or clients of the local network must have their routing table indicating the modem as the gateway to the remote network to use the resources of the multi-link. The existence of the multi-link does not in any manner alter the possibility of using the different accesses independently of the multi-link by configuration of the routing on the modem.

Once the multi-link has been established, it is advisable to retain the control connection. Indeed, this makes it possible to deal with any modification of the number of access between the local network and the remote network. When, for instance, one connection falls, the modem should inform the gateway to no longer use this access for the traffic coming from the remote network to the local network. It is also possible to add a new access that would be available to the multi-link. The control link can also be used for communication between the gateway and the modem of information on the different links, information that may be useful for the policy of choosing one of the accesses during the routing of a packet.

An interesting development of this possibility of making the multi-link evolve dynamically over time with regard to its composition is the processing of roaming. In fact, a roaming appliance during its roaming will see the networks to which it can have access change. As long as at least one connection remains operational, the multi-link remains functional. The loss of the connection to a network results in the withdrawal of this link from the multi-link, while the connection to a new network that has become accessible results in its addition in the multi-link. In this fashion a roaming appliance can migrate from one network to another while all the while retaining its connection with the remote networks via the multi-link, the changes of access remaining transparent for the applications.

Figure 5:
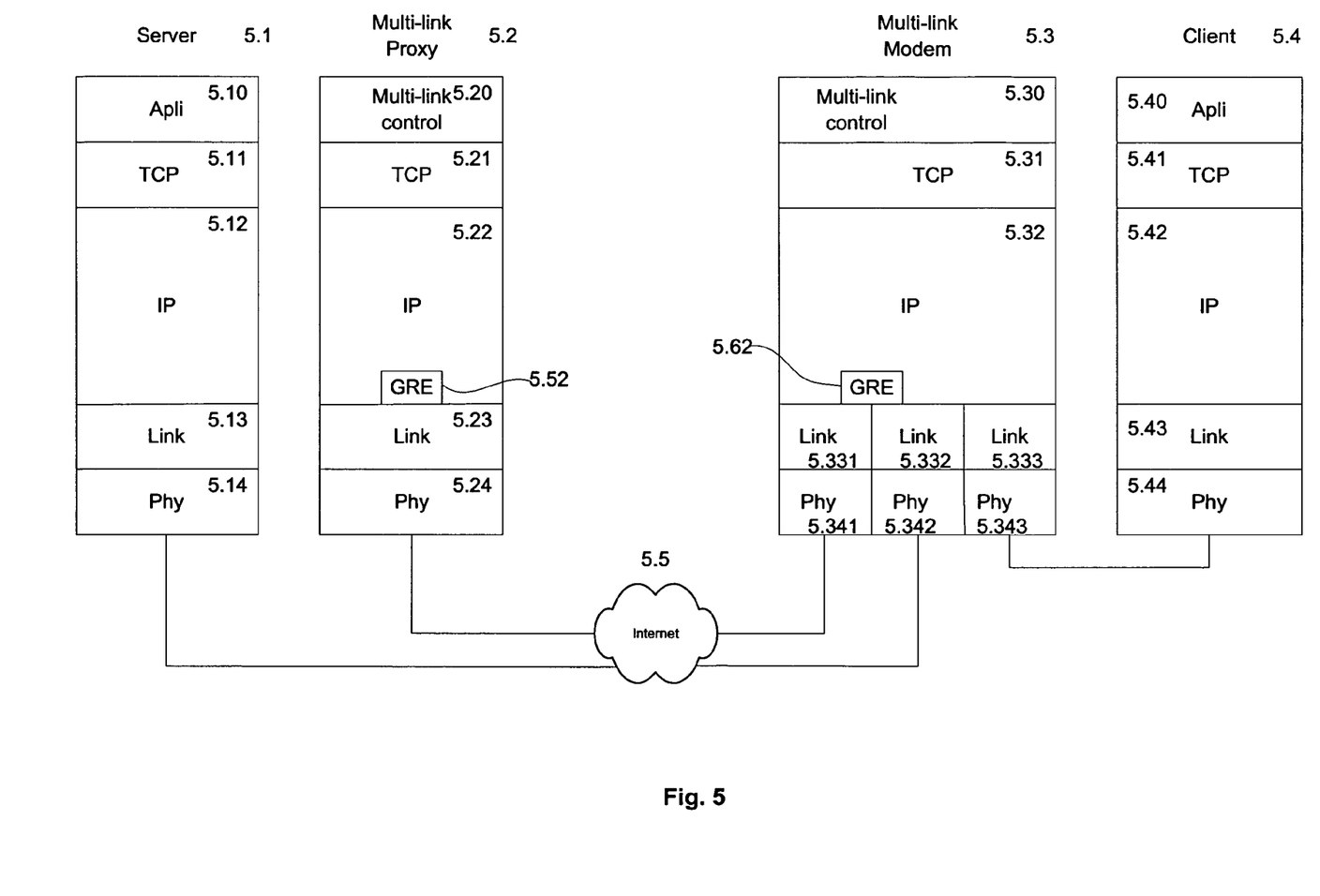
FIG. 5 represents the software architecture diagram of one embodiment of the invention.

FIG. 5 illustrates the software architecture diagram of the embodiment of the invention. In it, we can see a client, referenced 5.4, having a standard software architecture made up of a physical layer, referenced 5.44, that could be Ethernet or a wireless network 802.11 for example, a link layer, referenced 5.43, the IP layer referenced 5.42, above it the TCP transport layer referenced 5.41 and an application layer referenced 5.40. At the other end of the system, the server, referenced 5.1, also possesses the same standard software architecture, the physical layer, referenced 5.14, the link layer, referenced 5.13, the IP layer, referenced 5.12, the TCP layer, referenced 5.11 and the application layer, referenced 5.10.

The multi-link gateway, referenced 5.2, will also present the same architecture, the physical layer, referenced 5.24, the link layer, referenced 5.23, the IP layer, referenced 5.22, the TCP layer, referenced 5.21 and the application layer, referenced 5.20. However, the gateway possesses a management module of the multi-link in its application layer, whereas a management module of the tunnels, referenced 5.52, according to the GRE protocol is integrated in the IP layer. This module integrates, besides the management of the tunnels itself, the switching module enabling the choice of the tunnel for each packet.

As for the multi-link modem, referenced 5.3, it possesses several physical layers referenced 5.341, 5.342 and 5.343. These physical layers are controlled by as many link layers referenced 5.331, 5.332 and 5.333. These different interfaces comprise a first interface, 5.333 and 5.343, of connection of the multi-link modem with the local network. The other interfaces corresponding to the different links between the modem and the remote network, referenced 5.5, here the Internet. The IP layer, referenced 5.32, contains the management module of the GRE tunnels referenced 5.62. Here also, this module integrates the dynamic switching module of the tunnel to be used on a packet base. As standard, there is the TCP layer, referenced 5.31, as well as the application layer 5.30 containing the control software of the multi-link.

The role of the control modules of the multi-link will be to carry out the initialization phase that has already been described as well as the follow-up of the multi-link. This follow-up will include the dynamic adaptation of the withdrawals and additions of links as well as the exchange of parameters or measurements of performance of each link in such a manner as to enable the dynamic choice of the link used by each switching module.

The choice made for the embodiment of the invention consists in the encapsulation of Ethernet type MAC level packets in the IP tunnels according to GRE. It is possible to realise the invention by remaining at the IP level and using other tunnel techniques. In the embodiment of the invention the multi-link emulates an Ethernet connection between the gateway and the modem. This emulation translates into the creation within the GRE module, both of the gateway as well as the modem, of a virtual Ethernet interface corresponding to the multi-link. Moreover, the establishment of the multi-link, in a comparable manner to the establishment of a connection over a link, will allocate a virtual IP address to the modem. The modem is therefore in a position to manage an IP address translation step (NAT) to mask the local network with respect to the remote network. Another option would consist in allocating as many addresses as machines over the local network, but this solution is not preferred owing to its consumption of addresses. The gateway therefore functions as an access server to the network by allocating IP addresses from its own addressing space to the multi-link modems establishing a connection with it.

Figure 6:
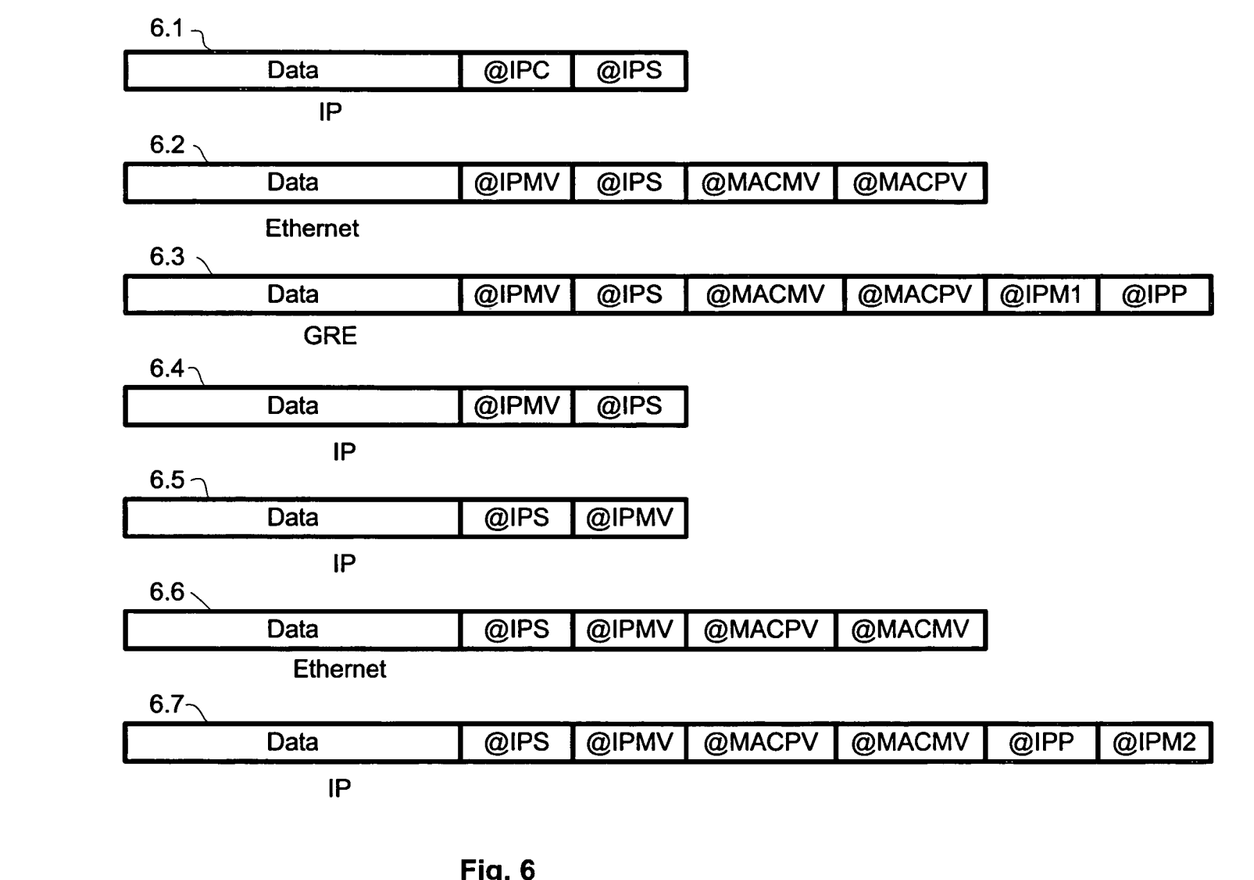
FIG. 6 represents the different data packets as well as the addresses used in one embodiment of the invention.

The details of an exchange of messages between a client of the local network and a server on the remote network will now be described with reference to FIG. 6. The client issues a query referenced 6.1. This query is an IP packet having as source address the IP address of the client over the local network @IPC and as destination address the IP address of the server on the remote network @IPS. Since the multi-link modem has been declared as gateway to the remote network, the packet is routed to it. On the modem, a first address translation phase is carried out, the source address of the packet is replaced by the virtual IP address @IPMV allocated to the modem at the time of the initialization of the multi-link. The modem stores the address of the client at the origin of the query. The packet is then processed by the GRE module. This module encapsulates the packet in an Ethernet packet, referenced 6.2, whose source and destination addresses are the addresses of the virtual Ethernet interfaces of the modem and the gateway @MACMV and @MACPV. This Ethernet packet is itself encapsulated in an IP packet according to GRE, referenced 6.3. It is here that the choice of the tunnel occurs. Depending on the tunnel chosen, the source IP address of the packet will be the IP address allocated to the modem at the time of establishing the link corresponding to this tunnel. The illustrated embodiment uses the first tunnel, the source address is therefore the IP address of the modem allocated by the first access provider @IPM1, the destination address is the address of the gateway @IPP. This packet is then processed by the interface corresponding to the tunnel chosen and routed to the gateway. The latter, decapsulates the packet, referenced 6.4, and routes it to the server. The response of the server, referenced 6.5, and meant for the virtual address @IPMV allocated by the gateway is routed to its destination via the gateway. This carries out the Ethernet encapsulation resulting in the packet referenced 6.6. Here, once again intervenes the choice of the tunnel that the response will take. The embodiment illustrates the choice of the second tunnel, the Ethernet packet will therefore be encapsulated in a GRE packet whose destination address is the address @IPM2, the address of the modem allocated by the second access provider and the source address is the address @IPP of the gateway. This IP packet will therefore be routed via the remote network to the second provider to arrive at the modem via the second access. On the modem the packet will be decapsulated, the destination address of the client will be restored as the destination address in accordance with the address translation protocol (NAT) and routed to the client. Hence, this means that the client and the server can communicate via the multi-link as if it involved a single connection linking the local network and the remote network. The modem as well as the gateway is free to route each packet equally via the different accesses constituting the multi-link. The path taken by a query does not determine the path of the response to this query. This connection established between the modem and the gateway will be used in a transparent manner by the applications operating on the client and connecting with the appliances of the remote network. In fact, the applications will communicate normally and open connections without having to be modified. Everything happens for these applications as if the connection were a standard single connection linking the local network to the remote network. This remains true in the case wherein the local network is reduced to the single client appliance directly integrating the multi-link modem functionality.

In this manner, through a judicious tunnel choice policy, it is possible to make full use of the different connections between the local network and the remote network. This choice policy can be based on a statistical distribution taking account of the different bandwidths of the links. However, it is also possible to dynamically collect statistics on the rate of use of the links for determining this choice. In this case, the modem and the gateway share the information on the links via the control connection. Different parameters can be retained for this choice, such as the error rate, the travelling time, the bandwidth, etc. It is also possible to privilege certain links for certain types of traffic, as choosing a link having a low travelling time for voice and a link having a high bandwidth for video. It is also possible to take into account economic criteria in the choice policy, particularly if certain links offer tariffs as per the quantity of data passing through the link.

The packets exchanged via several links can lose their initial sequence order, particularly if the different links have different latency times. Even though rescheduling is managed by the higher protocol layers such as TCP, it may be interesting to carry it out at this level. To accomplish this, it is possible to use a GRE option for adding a sequence number enabling the sequence to be recomposed.

The embodiment illustrates a tunnel technique, GRE, and the emulation of an Ethernet link in the tunnel. It is obvious persons skilled in the art that it is possible to use any other tunnel creation technique and that other choices of the encapsulated layer in the tunnel are possible. In particular, it is possible to encapsulate the IP packets directly without going through an Ethernet packet.

Naturally, the invention is not restricted to the previously described embodiments.

In particular, the embodiment illustrates the case of a modem linking a local network to a remote network and being used for relaying the packets between one or more clients of the local network and appliances, typically server, of the remote network. It is obvious that, according to the invention, the local network can be reduced to an appliance called modem, which is then integrated to a single client wishing to communicate with the remote network.

The invention claimed is:

1. Method of establishing a multi-link connection between a local communication network through digital data packets, said local communication network comprising a multi-link modem, and a remote network, said remote network comprising a multi-link gateway, wherein the method comprises the following steps:
   - opening of a connection for each interface of the multi-link modem with the remote network;
   - establishing of a control link over any of said opened connections, said control link being dedicated to exchanges between the multi-link modem and the multi-link gateway, for controlling the function of the multi-link connection through transmission of information shared over said control link between said multi-link modem and said multi-link gateway to a dynamic switching module for choosing a tunnel used for relaying packets, said control link being established between said multi-link modem and said multi-link gateway,
   - for each of the connections thus opened, establishment of a corresponding communication tunnel between the multi-link modem and said multi-link gateway using the said connections, and
   - for each digital data packet exchanged between the local network and the remote network, both through the modem as well as the gateway, a choice of the tunnel used for routing the packet in a transparent manner for the applications using the multi-link connection, said choice being based on said information shared between said multi-link modem and said multi-link gateway over said control link.

2. Method according to claim 1, wherein it comprises furthermore of an allocation step of virtual address to the multi-link modem by the multi-link gateway.

3. Method according to claim 1, wherein said controlling the function of the multi-link via said control link between the multi-link modem and the multi-link gateway comprising a dynamic adaptation to withdrawals and additions of connections between said multi-link modem and said multi-link gateway.

4. Method according to claim 1, wherein the choice step is carried out according to parameters specific to each tunnel.

5. Method according to claim 4, wherein the parameters specific to each tunnel used in the choice step include the instantaneous usage rate of each connection.

6. Multi-link communication appliance for establishing a multi-link connection between a local communication network through digital data packets, said local communication network comprising said multi-link communication appliance, and a remote network, said remote network comprising a multi-link gateway, said multi-link communication appliance comprising a plurality of means of opening connections between the local network and the remote network, wherein it further comprises:
   - interfaces for opening connections between itself and the remote network,
   - a control module for establishing of a control link over any of said opened connections, and for controlling the function of the multi-link using said control link, said control link being dedicated to exchanges between the multi-link modem and the multi-link gateway, for controlling the function of the multi-link connection through transmission of information shared over said control link between said multi-link modem and said multi-link gateway to a dynamic switching module for choosing a tunnel used for relaying packets, said control link being established between said multi-link communication appliance and said multi-link gateway,
   - for each of the connections thus opened, a management module for establishing a corresponding communication tunnel between itself and said multi-link gateway using the said connection, and
   - for each digital data packet that it relays between the local network and the remote network, a dynamic switching module for choosing of the tunnel used for relaying the said packet, said choice being based on said information shared between said multi-link modem and said multi-link gateway over said control link.

7. Appliance according to claim 6, wherein the control module further allows for a dynamic adaptation to withdrawals and additions of connections between said multi-link communication appliance and said multi-link gateway.

8. Multi-link data packet relay appliance that can be connected to a communication network through digital data packets over a multi-link connection, wherein it comprises a control module for establishing of a control link over said multi-link connection, and for controlling the function of the multi-link connection using said control link, said control link being dedicated to exchanges between said multi-link data packet relay appliance and a second multi-link data packet relay appliance giving access to a second communication network, for controlling the function of the multi-link connection through transmission of information shared over said control link between said multi-link modem and said multi-link gateway to a dynamic switching module for choosing a tunnel used for relaying packets, said control link being established between said multi-link communication appliance and said second multi-link data packet relay appliance, said controlling function of said control module choosing a tunnel for routing of a packet over said multi-link connection.

9. Appliance according to claim 8, wherein said control module further controls dynamic adaptation to withdrawals and additions of connections between said multi-link data packet relay appliance and said second multi-link data packet relay appliance.

* * * * *